March 3, 1959     D. GILL ET AL     2,875,630
MECHANICAL MOVEMENT DEVICE
Filed Dec. 16, 1957     2 Sheets-Sheet 2
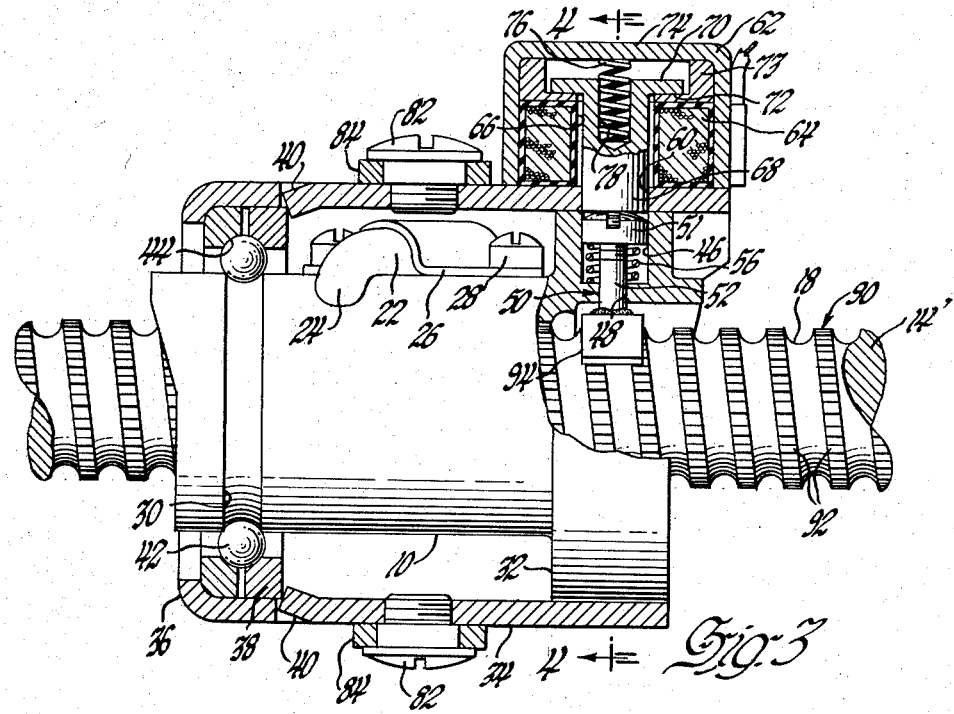
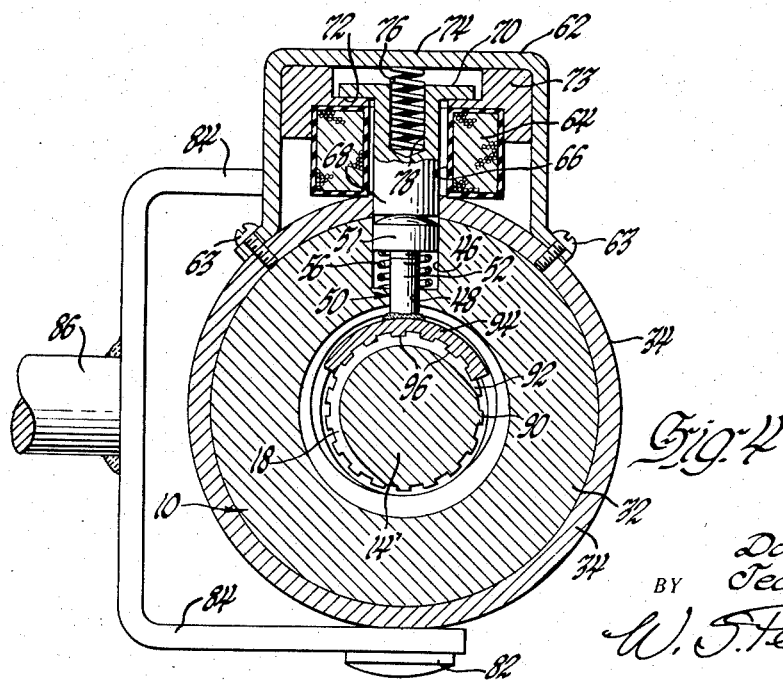
INVENTORS
Douglas Gill &
Jean V. Syring
BY
W. S. Pettigrew
ATTORNEY

# United States Patent Office
2,875,630
Patented Mar. 3, 1959

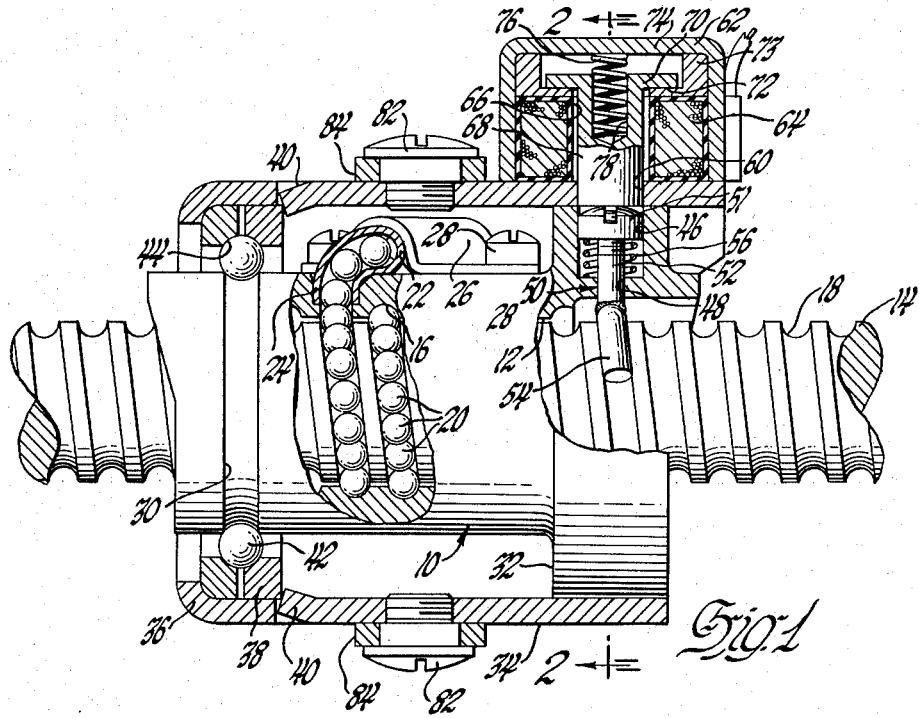

2,875,630

MECHANICAL MOVEMENT DEVICE

Douglas Gill, Saginaw, and Jean V. Syring, Bay City, Mich., assignors to General Motors Corporation, Detroit, Mich., a corporation of Delaware Application December 16, 1957, Serial No. 703,092

10 Claims. (Cl. 74—424.8)

This invention relates to mechanical movement devices and more particularly to screw and nut actuators.

The screw and nut actuator of this invention is of the general type including a helically threaded lead screw and a recirculating ball type nut threadedly receiving the lead screw. The nut rotatably supports a housing which is adapted to be secured to a member to be operated so as to be non-rotatable. The nut may be selectively and alternately braked to the lead screw or to the housing to selectively and alternately secure the nut and lead screw together for simultaneous rotational movement or to secure the nut to the housing for axial movement of the nut and housing along the lead screw upon rotation thereof. The screw and nut actuators of this invention operate in a smooth and quiet manner and have many uses, such as actuators in power operated vehicle seat adjuster structures.

In one preferred embodiment of this invention, the nut mounts a brake member including a brake shoe which is adapted to frictionally engage the lead screw intermediate the crest of the thread thereof. The nut rotatably supports a non-rotatable housing provided with an aperture, and the brake member is spring biased out of the nut toward the housing and the aperture therein when aligned therewith. The non-rotatable housing mounts a solenoid coil having an armature which is spring biased to a position where it fits within the aperture of the housing. Thus, the armature normally prevents the brake member from fitting within the aperture when aligned therewith to normally hold the brake member within the nut and hold the brake shoe thereof in engagement with the lead screw whereby the nut and lead screw are normally braked together for simultaneous rotational movement. However, if the solenoid coil is energized to retract the solenoid armature out of the aperture of the housing, the brake member will then be spring biased into this aperture when aligned therewith to move the brake shoe out of engagement with the lead screw and brake the nut to the housing whereby the nut and housing will move axially of the lead screw upon rotation thereof.

In another preferred embodiment of this invention, the crest of the thread of the lead screw is provided with axially aligned teeth and the brake shoe of the brake member is also provided with axially extending teeth to intermesh with the teeth of the lead screw when the nut and lead screw are normally braked together for simultaneous rotational movement.

The primary object of this invention is to provide an improved screw and nut actuator. Another object of this invention is to provide an improved screw and nut actuator of the type including a helically threaded lead screw and a recirculating ball type nut. A further object of this invention is to provide an improved screw and nut actuator of the type including a helically threaded screw and a recirculating ball type nut rotatably supporting a non-rotatable housing wherein the nut may be selectively and alternately braked to the lead screw for simultaneous rotational movement therewith or may be braked to the housing for axial movement of the nut and housing relative to the lead screw upon rotational movement thereof. These and other objects of this invention will be readily apparent from the following specification and drawings, wherein:

Figure 1 is a partial axial sectional view of a screw and nut actuator according to one embodiment of this invention with parts thereof broken away;

Figure 2 is a sectional view taken on the plane indicated by line 2—2 of Figure 1;

Figure 3 is a view similar to Figure 1 showing another embodiment of this invention; and Figure 4 is a sectional view taken along the plane indicated by line 4—4 of Figure 3.

Referring now particularly to Figure 1 of the drawings, an annular nut 10 includes a helically threaded bore 12 which receives a helically threaded lead screw 14. The helical groove 16 of bore 12 and the helical groove 18 of the lead screw are of the same pitch and define a helical passage. A plurality of ball bearings 20 fit within the helical passage and ride in each of the helical grooves, with opposite ends of the helical passage being interconnected by a transfer tube 22, the ends 24 of which extend tangentially to the helical passage. A bracket 26 bolted to the nut at 28 secures the tube 22 in place. The arrangement is such that the balls recirculate through the helical passage and the transfer tube 22 whenevr the nut and lead screw rotate relative to each other, that is, the nut does not rotate with the lead screw but remains stationary, whereby the nut will move axially along the lead screw if the lead screw rotates in place, or the lead screw will axially thread into and out of the nut if the nut remains stationary and in place.

The nut 10 further includes a circumferential circular groove 30 adjacent one end thereof and an annular laterally extending rather thick flange 32 adjacent the other end thereof. A circular sheet metal housing 34 surrounds the nut, with the flange 32 of the nut rotatably supporting one end of the housing 34. The other end of the housing includes a laterally inwardly extending flange 36 and the outer race 38 of a thrust bearing engages flange 36 and is held thereagainst by a number of laterally inwardly bent tangs 40 of housing 34. The circumferential groove 30 of the nut 10 provides the inner race of the thrust bearing and a number of ball bearings 42 fit within groove 30 and the groove 44 of race 38 to rotatably support the other end of the housing 34.

The annular flange 32 of the nut is provided with a circular bore 46 and a bore 48 of smaller diameter than bore 46 connects bore 46 with the bore 12 of the nut. A headed stud 50 has the head 51 thereof slidably mounted within bore 46 and the shank 52 thereof slidably mounted in bore 48 and being secured to a brake shoe member 54. As can be seen best in Figures 1 and 2, the brake shoe member is arcuate in shape and cross section and is adapted to frictionally engage the helical groove 18 of the lead screw 14. A compression spring 56 seats against the head 51 of the stud 50 and against the shoulder between bores 46 and 48 to bias the stud outwardly of bore 46 and thereby bias the brake shoe member 54 out of engagement with the helical groove 18 of the lead screw.

The housing 34 is provided with a circular aperture 60 which may be aligned with bore 46 and is of substantially the same diameter as the bore. A generally square-shaped housing 62 is bolted at 63, to housing 34 and covers the aperture 60. A solenoid coil 64 fits within the housing and includes a central circular passage 66 which is fixedly aligned with the aperture 60. The solenoid armature 68 is circular in shape so as to be slidably received within passage 66 and is provided with a flat head 70 which is adapted to selectively and alternately engage a shoulder 72 of a spacer member 73 or the upper wall 74 of housing 62 to locate the armature in its extended and retracted positions respectively. A compression spring 76 engages wall 74 and the base of a bore 78 within the solenoid armature so as to bias the solenoid armature outwardly of passage 66 to its extended position wherein head 70 of the armature engages the shoulder 72 of the spacer 73 and the end of the armature fits within aperture 60 but does not project outwardly thereof. The compression spring 76 is stronger than the compression spring 56 whereby the compression spring 76 will normally hold the solenoid armature 68 in its position, as shown in Figure 1, against the action of the spring 56 on the head 51 of the stud 50.

Housing 34 may be bolted at 82 to the arms 84 of a yoke member 86 which may be secured to a member to be operated, not shown. The yoke member is shown only for the purposes of illustration to indicate the manner in which the housing 34 may be secured to a member to be operated so as to be non-rotatable.

The operation of the screw and nut actuator of this invention will now be described, and it will be assumed that a motor is operatively connected to the lead screw 14 so as to rotate the lead screw in either direction. Assuming now that the solenoid armature 68 and the stud 50 are in their normal position, as shown, and the lead screw is rotated by the motor, not shown, the nut 10 will simultaneously rotate with the lead screw 14 relative to the housing 34 due to the frictional engagement of the brake shoe member 54 with the helical groove 18 of the lead screw 14. As soon as the head 51 of the stud 50 moves out of engagement with the lower end of the armature 68, the head of the stud will ride on the inner wall of the housing 34 until it again engages the lower end of the armature 68 after the nut and lead screw have completed one revolution. It will be remembered that the lower end of the armature 68 does not extend outwardly of the aperture 60 so as to in any manner interfere with rotation of the nut simultaneously with the lead screw. During this simultaneous rotational movement of the nut and lead screw, the housing 34 will remain stationary with respect to the nut and lead screw and the ball bearings 20 will not recirculate within the helical passage defined by the grooves 16 and 18 of the nut and lead screw and within the transfer tube 22 since there is no relative rotational movement between the nut and lead screw.

Assuming now that the solenoid coil 64 is energized to move the solenoid armature 68 to its retracted position against the action of spring 76, this will move the lower end of the armature out of the aperture 60. Thus, if the lead screw and nut continue to rotate together, as soon as the opening of bore 46 comes into alignment with aperture 60, spring 56 will bias the stud 50 outwardly of bore 46 to move the head 51 of the stud into the aperture 60 to thereby brake the nut 10 to the housing 34 and move the brake shoe member 54 out of engagement with the helical groove 18 of the lead screw. Upon continued rotation of the lead screw, the nut will no longer rotate with the lead screw, but will move axially of the lead screw with the housing 34 so as to operate yoke member 86 and in turn operate the member to be operated. During this movement of the nut and housing 34 axially of the lead screw, the ball bearings 20 will recirculate within the helical passage defined by the grooves 16 and 18 of the nut and lead screw and within the transfer tube 22. It will be understood, of course, that the direction of axial movement of the nut and housing 34 along the lead screw is controlled by the direction of rotation of the lead screw.

Whenever the solenoid coil 64 is deenergized, spring 76 will immediately move the solenoid armature 68 to its extended position to move the head 51 of stud 50 out of the aperture 60 and into the bore 46 to thereby move the brake shoe member 54 again into frictional engagement with the helical groove 18 of the lead screw so that the nut and lead screw will again simultaneously rotate together. Thus, the nut 10 may be instantaneously braked to the lead screw after being braked to the housing 34, but it will be understood, of course, that the nut may have to complete as much as one complete revolution before the nut can be braked to the non-rotatable housing 34 since the opening of bore 46 and aperture 60 must be aligned before the nut 10 and housing 34 can be braked together.

Referring now particularly to Figures 3 and 4, another embodiment of this invention will be described and like numerals will be used for like parts.

In this embodiment of the invention the crest 90 of the thread of lead screw 14' is of toothed formation, with each tooth 92 extending axially and being axially aligned with the next successive axially spaced tooth 92. An arcuately shaped brake shoe member 94 is secured to the shank 52 of stud 50 and is provided with a plurality of teeth 96 which also extend axially relative to the axis of the lead screw 14'. Whenever the solenoid armature 68 is located in its normal extended position by spring 76 so that the lower end of the solenoid armature fits within aperture 60 to prevent the head 51 of stud 50 from fitting within the aperture, teeth 96 of the brake shoe member 94 will intermesh with the teeth 92 of the crest 90 of the lead screw so that the nut and lead screw are braked together whereby they will rotate together if the lead screw is operated. However, should the solenoid coil 64 be energized to move the solenoid armature 68 to its retracted position wherein the lower end of the armature moves out of aperture 60, the brake shoe member 94 will be moved out of engagement with the crest of the lead screw as the head 51 of stud 50 moves within aperture 60 to brake the nut and housing 34 together for axial movement relative to the lead screw upon rotation of the lead screw. The screw and nut actuator shown in Figures 3 and 4 is similar in all other respects to that shown in Figures 1 and 2 of the drawings and operates in the same manner as has been previously described.

Thus, this invention provides a new and improved screw and nut actuator which includes a helically threaded lead screw and a recirculating ball type nut. The nut is normally and selectively braked to the lead screw for simultaneous rotational movement therewith whenever the lead screw is rotated and may be selectively braked to a non-rotatable housing so as to secure the nut against rotation for axial movement of the nut and housing along the lead screw upon rotational movement thereof.

We claim:

1. A mechanical movement device comprising, first and second rotatable members, means interconnecting said members for movement of one of said members relative to the other of said members upon relative rotational movement therebetween, locking means on one of said members normally engageable with the other of said members whereby said members are secured together for simultaneous rotational movement, a non-rotatable member, and means for moving said locking means out of engagement with said other member and into engagement with said non-rotatable member to secure said one member against rotation for axial movement thereof relative to said other member upon relative rotational movement therebetween.

2. A mechanical movement device comprising, first and second rotatable members, means interconnecting said members for movement of one of said members relative to the other of said members upon relative rotational movement therebetween, locking means on one of said members normally engageable with the other of said members whereby said members are secured together for simultaneous rotational movement, a non-rotatable member, and means for selectively moving said locking means out of engagement with said other member and into engagement with said non-rotatable member to secure said one member against rotation for selective axial movement thereof relative to said other member upon relative rotational movement therebetween.

3. A mechanical movement device comprising, first and second rotatable members, means interconnecting said members for movement of one of said members relative to the other of said members upon relative rotational movement therebetween, locking means on one of said members engageable with the other of said members to secure said members to each other for simultaneous rotational movement, means normally biasing said locking means out of engagement with said other member, means normally holding said locking means in engagement with said other member against the action of said biasing means, a non-rotatable member, and means for selectively moving said holding means to a position allowing said biasing means to move said locking means out of engagement with said other member and into engagement with said non-rotatable member to secure said one member against rotation for selective axial movement thereof relative to said other member upon relative rotational movement therebetween.

4. A mechanical movement device comprising, first and second rotatable members, means interconnecting said members for movement of one of said members relative to the other of said members upon relative rotational movement therebetween, a non-rotatable member, locking means on one of said rotatable members selectively engageable with the other of said rotatable members or said non-rotatable member to selectively and alternately secure said rotatable members together for simultaneous rotational movement or to secure said one member to said non-rotatable member for axial movement thereof relative to said other member upon relative rotational movement therebetween, means normally holding said locking means in engagement with said other rotatable member, and means selectively operable to move said locking means out of engagement with said other rotatable member and into engagement with said non-rotatable member.

5. A mechanical movement device comprising, first and second rotatable members, means interconnecting said members for movement of one of said members relative to the other of said members upon relative rotational movement therebetween, a non-rotatable member, a locking member mounted on one of said rotatable members for selective and alternate engagement with said other rotatable member or said non-rotatable member to selectively and alternately secure said rotatable members together for simultaneous rotational movement or to secure said one rotatable member to said non-rotatable member for axial movement thereof relative to said other rotatable member upon relative rotational movement therebetween, means normally biasing said locking member out of engagement with said other rotatable member and into engagement with said non-rotatable member, a movable member mounted on said non-rotatable member and normally holding said locking member out of engagement with said non-rotatable member, and means for selectively moving said movable member out of the path of said locking member to allow said biasing means to move said brake member into engagement with said non-rotatable member.

6. A mechanical movement device comprising, a lead screw member, a nut member threadedly receiving said lead screw member for axial movement thereof relative to said lead screw upon relative rotational movement therebetween, locking means on said nut member normally engageable with said lead screw to secure said nut and lead screw together for simultaneous rotational movement, a non-rotatable member, and means for selectively moving said locking means out of engagement with said lead screw member and into engagement with said non-rotatable member to secure said nut member against rotation for selective axial movement thereof relative to said lead screw member upon relative rotational movement therebetween.

7. A mechanical movement device comprising, a lead screw member, a nut member threadedly receiving said lead screw member for axial movement thereof relative to said lead screw upon relative rotational movement therebetween, locking means on said nut member normally engageable with the thread of said lead screw member to secure said nut and lead screw members for simultaneous rotational movement, a non-rotatable member, and means for selectively moving said locking means out of engagement with the thread of said lead screw member and into engagement with said non-rotatable member to secure said nut member against rotation for selective axial movement thereof relative to said lead screw member upon relative rotational movement therebetween.

8. A mechanical movement device comprising, a helically threaded lead screw member, a nut member threadedly receiving said lead screw member for axial movement thereof relative to said lead screw upon relative rotational movement therebetween, locking means on said nut member normally engageable with the crest of the thread of said lead screw member to secure said members together for simultaneous rotational movement, a non-rotatable member, and means for selectively moving said locking means out of engagement with the crest of the thread of said lead screw member and into engagement with said non-rotatable member to secure said nut member against rotation for selective axial movement thereof relative to said lead screw member upon relative rotational movement therebetween.

9. A mechanical movement device comprising, a helically threaded lead screw member having a toothed crest, a nut member threadedly receiving said lead screw member for axial movement thereof relative to said lead screw upon relative rotational movement therebetween, locking means on said nut member including a toothed clutch member normally engageable with the toothed crest of said lead screw to secure said members together for simultaneous rotational movement thereof, a non-rotatable member, and means for selectively moving said locking means out of engagement with the crest of said lead screw member and into engagement with said non-rotatable member to secure said nut member against rotation for selective axial movement thereof relative to said lead screw member upon relative rotational movement therebetween.

10. A mechanical movement device comprising, a lead screw member, a nut member threadedly receiving said lead screw member for axial movement thereof relative to said lead screw upon relative rotational movement therebetween, a locking member mounted on said nut member for movement relative thereto and including a clutch shoe adapted to engage said lead screw to secure said nut and lead screw together for simultaneous rotational movement thereof, a non-rotatable member rotatably supported on said nut member, means normally holding siad locking member out of engagement with said non-rotatable member to hold the shoe thereof in engagement with said lead screw and thereby secure said nut and lead screw members together for simultaneous rotational movement, and means for selectively moving said locking member into engagement with said non-rotatable member to secure said nut member against rotation for selective axial movement thereof relative to said lead screw upon relative rotational movement therebetween.

References Cited in the file of this patent

UNITED STATES PATENTS

| | | |
|---|---|---|
| 1,276,811 | Ragan | Aug. 27, 1918 |
| 2,504,018 | Gibson et al. | Apr. 11, 1950 |
| 2,701,478 | Riess | Feb. 8, 1955 |
| 2,716,352 | Wilson | Aug. 3, 1955 |